United States Patent [19]

Choi et al.

[11] 4,088,541

[45] May 9, 1978

[54] APPARATUS FOR PYROLYZING ORGANIC SOLID WASTE

[75] Inventors: Charles K. Choi, Claremont; Richard M. Gundzik, Placentia; Joseph P. Tassoney, Diamond Bar, all of Calif.

[73] Assignee: Occidental Petroleum Corporation, Los Angeles, Calif.

[21] Appl. No.: 719,271

[22] Filed: Aug. 31, 1976

Related U.S. Application Data

[63] Continuation-in-part of Ser. No. 603,876, Aug. 11, 1975, abandoned.

[51] Int. Cl.² .............................................. C10B 49/16
[52] U.S. Cl. ........................................ 202/99; 48/111
[58] Field of Search ..................... 201/2.5, 3, 4, 7, 8, 201/10, 12, 13, 14, 15, 16, 20, 21, 25, 28, 29, 30, 31, 32, 37, 42, 33, 38, 122; 48/111, 209, 197 A; 202/85, 88, 91, 93, 96, 99, 108, 121, 208, 211, 215, 86, 87

[56] References Cited

U.S. PATENT DOCUMENTS

| | | | |
|---|---|---|---|
| 2,560,403 | 7/1951 | Arveson | 48/202 |
| 2,608,526 | 8/1952 | Rex | 201/31 X |
| 2,741,549 | 4/1956 | Russell | 48/206 |
| 3,167,494 | 1/1965 | Crawford | 208/8 |
| 3,251,751 | 5/1966 | Lindahl et al. | 201/12 |
| 3,322,521 | 5/1967 | Cockerham | 48/63 |
| 3,444,048 | 5/1969 | Schmeling et al. | 202/121 |
| 3,574,065 | 4/1971 | Eddinger et al. | 201/12 |
| 3,655,518 | 4/1972 | Schmalfeld et al. | 201/12 X |
| 3,698,882 | 10/1972 | Garrett et al. | 48/210 |
| 3,736,233 | 5/1973 | Sass et al. | 201/20 X |
| 3,846,096 | 11/1974 | Mallan et al. | 48/209 |
| 3,853,498 | 12/1974 | Bailie | 201/2.5 X |
| 3,957,459 | 5/1976 | Mitchell et al. | 201/31 X |

FOREIGN PATENT DOCUMENTS

| | | |
|---|---|---|
| 1,353,067 | 5/1974 | United Kingdom. |
| 1,398,858 | 6/1975 | United Kingdom. |

*Primary Examiner*—Joseph Scovronek
*Attorney, Agent, or Firm*—Christie, Parker & Hale

[57] ABSTRACT

Apparatus for carrying out an essentially closed loop pyrolysis process includes a pyrolysis reactor, a first collection vessel in which the carbon containing solid residue of pyrolysis is separated from the products of the reactor and deposited, a conduit from the first collection vessel to a burner, a second collection vessel in which the particulate source of heat produced by the burner is deposited, and a return conduit from the second collection vessel to the pyrolysis reactor. A higher pressure is established at the outlet of each collection vessel than the pressure at the inlet to which it is coupled. Specifically, each collection vessel comprises a hopper, a standpipe extending downwardly from the hopper to the outlet of the collection vessel, an angle riser through which the particles at the outlet of the vessel are transported by a transport gas, and a vertical riser through which the particles are lifted to the inlet in a less dense state than in the corresponding vessel.

14 Claims, 4 Drawing Figures

4,088,541

APPARATUS FOR PYROLYZING ORGANIC SOLID WASTE

CROSS REFERENCE TO RELATED APPLICATION

This is a continuation-in-part of our Application Serial No. 603,876 filed Aug. 11, 1975, now abandoned.

BACKGROUND OF THE INVENTION

The present invention is directed to the pyrolysis of organic solid wastes from industrial and municipal sources.

The disposal of wastes both from municipal and industrial sources, such as trash, rubbish, garbage, animal wastes, agricultural wastes, and waste of plastic processing operations is rapidly becoming of immense national concern. The cost of disposal ranks third behind public schooling and highways as municipal expense in the United States.

It is estimated that each individual in the country generates between 4 and 6 pounds of waste per day, that the industrial output is equivalent to approximately 5 pounds of solid waste per person per day. Previous methods of mass waste disposal, such as landfill, are becoming impossible, while others such as incineration are costly and result in air pollution problems.

A vast majority of the waste which is presently disposed of contains products which are immediately recyclable back into the economy or products into which the waste can be converted for recycle back to the economy. Directly recylable constituents are the various metals present, such as aluminum and steel, and glass. For the most part, the organic solid waste fraction may be subject to a flash pyrolysis as an operation independent of recovery of the directly recyclable inorganic fraction and any organic portion recovered as pulp. Flash pyrolysis yields carbon containing solid residue of pyrolysis, pyrolytic oil and gases as products.

SUMMARY OF THE INVENTION

According to the invention, a pressure seal is established in one or both cross connections of apparatus for carrying out an essentially closed loop pyrolysis process. This prevents backflow of oxygen containing gas to the pyrolysis side of the apparatus and/or valuable products of pyrolysis to the oxidizing burner side of the apparatus.

Specifically, particulate organic solid waste and a fluidized particulate source of heat are passed through a transport pyrolysis reactor at a given temperature under turbulent flow conditions for a time sufficient to pyrolyze the organic solid waste to carbon containing solid residue of pyrolysis, pyrolytic oils, and gas. The inlet of the pyrolysis reactor is at a given pressure. The particulate source of heat in admixture with the carbon containing solid residue of pyrolysis is separated from the pyrolytic oils and gas and deposited in a first collection vessel. The collected particulate mixture is transported in a fluidized state from the first collection vessel to the burner through which it passes in the presence of oxygen for a time sufficient to partially or totally decarbonize the carbon containing said residue of pyrolysis to heat the particulate source of heat to a given temperature to generate additional particulate source of heat. The inlet of the burner is at a given pressure. The hot particulate source of heat is deposited in a second collection vessel from which it is transported to the pyrolysis reactor. A higher pressure is established at the outlet of one of the collection vessels than the given pressure at the inlet to which it is connected to prevent reverse flow to the one collection vessel. Reverse flow to the other collection vessel is also prevented.

Preferably, reverse flow to the other collection vessel is also prevented by establishing a higher pressure at the outlet of the other collection vessel than the given pressure at the inlet to which it is connected. The high pressure at the outlet of each collection vessel is established by a vertical standpipe extending downwardly from the corresponding collection vessel such that the bottom of the standpipe defines the outlet of the corresponding collection vessel. The particles in the corresponding collection vessel are aerated to a dense fluidized state. During transport to the corresponding inlet by a transport conduit, the particles are further aerated into a substantially less dense fluidized state. Each transport conduit comprises an angle riser having a low end and a high end, an angle bend connecting the bottom of the standpipe to the low end of the angle riser, and a vertica riser having a bottom connected to the high end of the angle riser, and a top connected to the corresponding inlet, i.e., the inlet of the pyrolysis reactor or the inlet of the burner.

Other features of the invention are described below in connection with the detailed description.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

Figure 1:
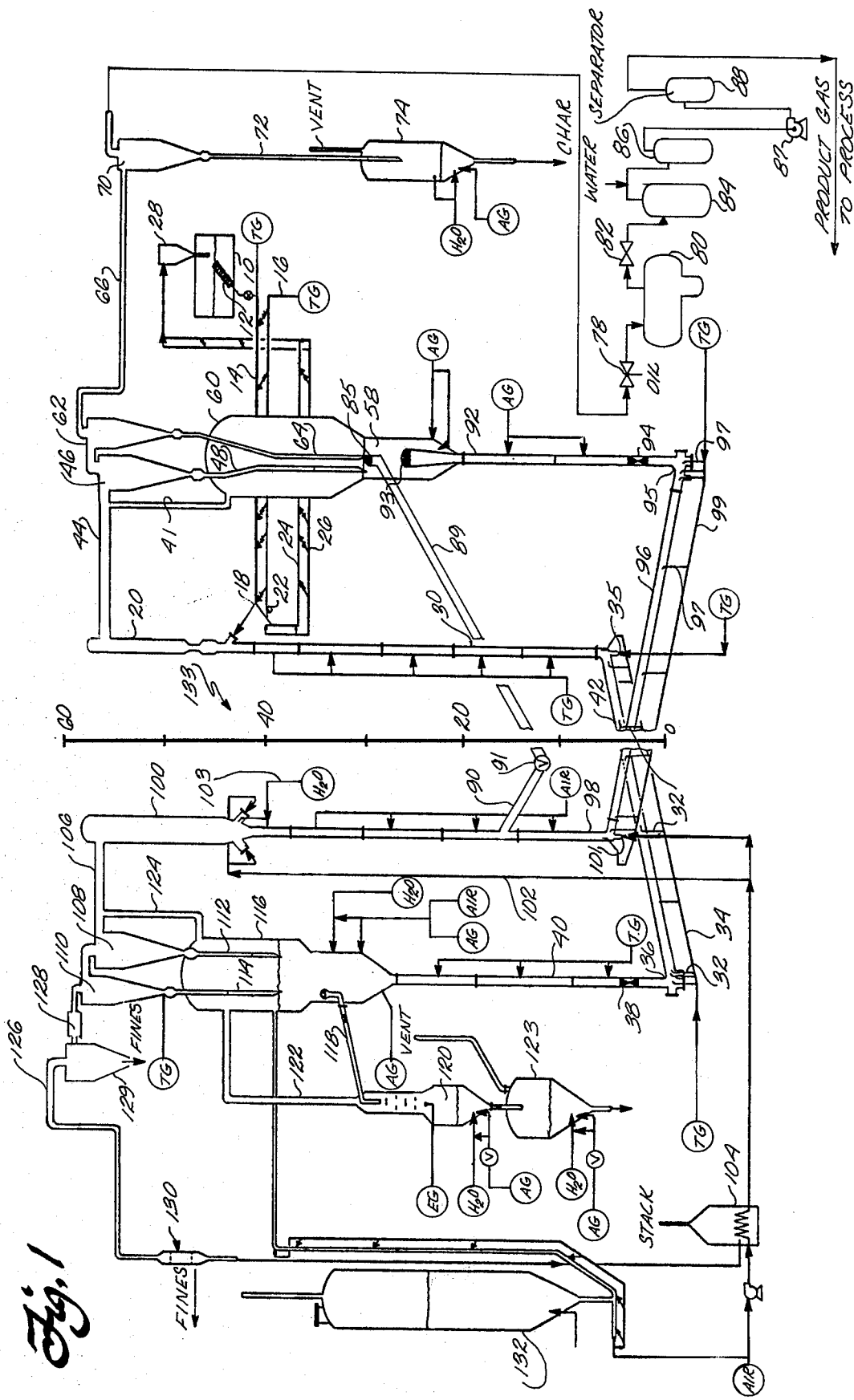
FIG. 1 is a schematic diagram of apparatus for carrying out a pyrolysis process in accordance with the principles of the invention.

There is provided in accordance with this invention, apparatus to carry out an essentially closed loop process for the pyrolysis of the organic solid waste fraction of municipal and industrial wastes.

As used herein, the term "organic solid wastes" means the predominately organic portion derived from as received waste source, domestic and/or industrial in origin, after gross separation into an inorganic constituent such as iron, aluminum, glass and other values including paper pulp. Because of the several comminuting operations attendant to the gross separation, there appears in the organic solid waste fraction some inorganic solid fines in an amount from about 5 to 8% by weight (dry basis) of the organic solid waste. In municipal waste, the fines are predominately glass. The inorganic fraction constitutes, except for fly ash removed or lost following decarbonization of the carbon containing solid residue of pyrolysis, an ideal inorganic heat source used for pyrolysis.

The organic constituents of the organic solid wastes include cellulosic materials, plastic, rubber stock, and animal waste. Included in the meaning of "cellulosic materials" are paper, tree trimming and bark, sawdust, crop waste, vegetable and fruit processing waste, and the like. "Plastics" include discarded household plastics, as well as the waste of industrial polymer forming and processing operations. "Rubber stock" includes waste tires. "Animal wastes" include household discards, slaughter house wastes, poultry processing wastes, manure, and the like.

Resulting from a generally sundry mixture of waste materials after gross separating substantially inorganic values, the organic solid waste may have, after drying to the extent prepared for transport to a pyrolysis reactor, the following typical analysis:

TABLE 1

| Constituent | % By Weight |
|---|---|
| Organics | 92.29 |
| Metals | 0.38 |
| Glass | 1.69 |
| Other Inorganics | 2.02 |
| Water | 3.62 |

When the organic solid waste is pyrolyzed, there is formed a mixture of carbon containing solid residue of pyrolsyis termed herein "char", pyrolytic oils, and gas. The gas includes transport gas and gases resulting from pyrolysis. The gas on a dry basis consists primarily of the oxides of carbon and hydrogen.

The char may, depending on the waste source, contain from about 50 to about 70% inorganics, the balance being carbonaceous in nature mainly containing carbon with some bound hydrogen and oxygen present. Bulk density of the char is from about 5.5 lbs./cu. ft. to 12.5 lbs./cu. ft.

The inorganic solid heat source or "ash" which is formed by decarbonization of char, has, in contrast to char, a bulk density between about 55 lbs./cu. ft. and 70 lbs./cu. ft. Its hard, glasslike nature makes an ideal source which may be readily generated from within the process itself. The ash has a fusion temperature between about 1425° F and about 1450° F, and a particle and skeletal density of about 150 lbs./cu. ft. When used as the particulate source of heat, a major quantity of fly ash is removed.

The pyrolytic oils formed while varying in nature depending upon the composition of the waste material processed and pyrolysis conditions employed are at the same time unique. They may be characterized as an oxygenated, complex organic fluid, typically up to 40% and in some cases up to 85% soluble in water, acids or base. Solubility in polar organic solvents such as glycerol is limited and the pyrolytic oils are relatively insoluble in non-polar organic solvents, such as diesel oil, carbon tetrachloride, pentane, decane, benzene, toluene, and hexane. The pyrolytic oil, however, can be successively blended and mixed with various #6 fuel oils. Combustion stability of the mixture is about the same as #6 fuel oil alone.

A typical example of an elemental analysis of the pyrolytic oil is that obtained from the pyrolysis of a waste material containing about 70% cellulosics. The oil thus obtained will contain from about 52% to about 60% carbon, from about 6% to about 8% hydrogen, from about 1% to about 2% nitrogen, and from about 29% to about 33% oxygen. The empirical formula which best fits the pyrolytic oil analysis is $C_5H_8O_2$. Specific gravities are unusually high, ranging from about 1.1 to about 1.4.

By a "non-deleteriously reactive" transport gas, there is meant a gas stream which is essentially lacking in free oxygen. Although constituents may react under non-oxidizing conditions with pyrolysis products to upgrade their value, to be avoided are constituents which degrade pyrolysis products.

With reference to FIG. 1, organic solid waste from which there has been a gross separation of inorganics and which is comminuted to particles having a maximum particle dimension less than 1 inch, preferably a particle size less than 5 mesh, and more preferably less than 8 mesh, is dried and stored in tank 10. The organic solid waste is conveyed at a desired rate by screw conveyor 12 to transport line 14. The solid organic waste is transported through transport line 14 as a concentrated fluidized mass using a transport gas, preferably product gas of the process to pyrolysis reactor 20. The transport gas is introduced directly to line 14 and at several points along its length through line 16 from a source of transport gas designated by the encircled letters "TG". If the organic feed rate is in excess of that required by the pyrolysis reactor 20, control valve 18 is closed and control valve 22 is opened, enabling a portion of the solid organic waste to be diverted by line 24, separated from its transport gas, which is introduced through line 26 by cyclone 28, and returned to tank 10.

Simultaneous with the introduction of the organic solid waste into pyrolysis reactor 20, a particulate source of heat along with its transport gas is also introduced thereto. The particulate source of heat may be any material capable of transferring heat to the organic solid waste to cause its pyrolysis into gases, pyrolytic oils, and char. The preferred heat source is the carbon containing solid residue of pyrolysis and/or the inorganic heat source obtained by decarbonization of the carbon containing solid residue of pyrolysis or "ash". The inorganic heat source is the particularly preferred source of heat because it is relatively attrition free, and is of high bulk density, which minimizes the elevation required to achieve the pressure seal discussed below.

Pyrolysis reactor 20 is operated, depending upon the temperature and the nature of the particulate source of heat at a temperature from between about 600° F and the introduction temperatures of the particulate heat source to the flash pyrolysis reactor. Reactor temperature is essentially sustained by the particulate heat source. Within this temperature range, pyrolysis occurs primarily with liquefication below about 1400° F and by gasification at temperatures above 1400° F. Where char is the source of heat, temperatures will range from about 600° F to about 2000° F. Where ash in whole or in part is a source of heat, the upper temperature limit is ascertained by the fusion temperature of the ash which is between about 1425° F and 1450° F. Ash, the preferred particulate source of heat, requires, when used, an operating temperature between 600° F and 1400° F. The preferred pyrolysis temperature is between about 800° F and 1350° F.

In pyrolysis reactor 20, heat transfer occurs primarily by solids to solids, with some solids to gas to solids heat transfer occurring. In general operation, organic solid waste feed temperature is approximately 100° F, and its transport gas from ambient up to about 500° F. The preferred transport gas for both the organic solid waste and the particulate source of heat is the gas resulting from the pyrolysis of the organic solid waste.

Residence time during pyrolysis is generally less than 10 seconds, preferably from 0.1 to 2 seconds, and more preferably, from about 0.2 to 0.4 second. The weight ratio of the particulate source of heat to organic solid waste will vary depending upon temperature of the particulate source of heat and the temperature desired in the pyrolysis reactor 20. Generally about 2 to about 20, preferably from 4 to 6 pounds of the particulate source of heat per pound of the comminuted organic solid waste is fed to the pyrolysis reactor 20. To achieve intimate mixing, turbulent flow conditions are required. Reynolds flow index numbers, therefore, will exceed 2,000 with Reynolds numbers in excess of 50,000 frequently employed.

Products of the pyrolysis, including the particulate source of heat, leave reactor 20 via line 44 and enter product cyclone 46 where heavy particles and particles of large diameter are separated. Particles settle through dipleg 48 into the constricted area 58 of stripper hopper 60. Finer dense particles and char particles are separated by cyclone 62 and are fed to hopper 60 through dipleg 64. Each dipleg has on its end a flap valve to prevent backflow of fluidizing gas in hopper 60 from interrupting the operation of cyclones 46 and 62. Cyclones 46 and 62 are designed to operate at a high efficiency to maximize separation of particles from the gas stream. Thus, cyclones 46 and 62 serve to separate the particulate source of heat and the char produced by pyrolysis from the pyrolytic oils and gas.

The residual gas stream, which includes the condensible pyrolytic oils and product gases, leaves by line 66 and enters fines separator cyclone 70, where fine char particles are recovered. The fine char particles descend dip leg 72 into char bin 74 for recovery as product. Inert aeration gas at a low temperature is introduced at the base of char hopper 74 to cool the char and maintain the char in a free flowing semifluid state.

The residual gases, substantially free of fines, pass by line 76 to quench venturi scrubber 78 where, by the introduction of a quench oil, the pyrolytic oils are caused to condense from the gas stream and collect in vessel 80. A second quench venturi scrubber 82 is used to remove residual pyrolytic oil which collects in settler 84. After scrubbing the gas in scrubber 86 and compression in compressor 87, residual condensates are collected in separator 88 to provide product gas for use in the process as transport gas. Excess gas may be flared to the atmosphere.

The char and the particulate source of heat collect in the lower, narrow zone 58 of hopper 60 and are maintained at a predetermined level by the rate of solids withdrawal through standpipe 92. The rate of such withdrawal is controlled by setting slide valve 94, which is located at the bottom of standpipe 92. Aeration gas, normally the product gas from a source designated in FIG. 1 by the encircled letters "AG", is introduced into the vertical and angles side of zone 58 to maintain the solids in a dense fluidized state. Aeration gas also serves to remove or strip oils which cling to the surface of the particles. The stripped oils are exhausted back to the product gas loop via bypass line 41. Normally, the level of the dense fluidized particles coincides with the top of narrow zone 58. Thus, particles which are entrained by the aeration gas, except extreme fines, lose velocity in the upper expanded section when they rise above the dense particle level and fall back below the level of the densed fluidized particles in zone 58. The aeration gas also cools the particles in hopper 60.

Particles in zone 58 are mixtures of the particulate source of heat and char. Where the particulate heat source is char alone, the content is essentially particulate char. Standpipe 92 extends into zone 58 of hopper 60 and thus serves to selectively couple the particles of intermediate weight to standpipe 92. Aeration gas is also introduced into standpipe 92 at distributed points along its length.

In the instance where char alone is present, the larger char particles tend to gravitate toward the base and the finer toward the top, with particles representing a cross section of the particles in zone 58 being at the middle. Thus, the particles admitted to standpipe 92 tend to represent the average particle size of the particles in zone 58.

Where zone 58 contains product char and a different high density heat source such as ash, the heavier ash particles tend to gravitate toward the bottom and the lighter char particles toward the top. By mixing with the aeration gas, the particles at the point by sampling, 93, represent compositionwise, the composition of the char and ash entering hopper 60.

If the extension of standpipe 92 into hopper 60 were eliminated, the feed to standpipe 92 would tend to contain only large particles if char alone is present, or a predominance of the dense particles if char and a different high density inorganic heat source or ash are used in the pyrolysis operation. The large and/or dense ash particles at the bottom of zone 58 are broken up by the aeration gas and eventually rise upward. The point of sampling 93 is, as shown, screened to reject clinkers.

Hopper 60 and standpipe 92 serve as a collection vessel for the mixture of particulate source of heat and char. The bottom of standpipe 92 serves as the outlet of the collection vessel. The column of dense fluidized particles in standpipe 92 and zone 58 lying above it produce a high potential pressure head that establishes a higher pressure at the bottom of standpipe 92 than the pressure at the inlet of burner 100. The pressure at the inlet of valve 94 is preferably about 1.5 to 3 times the pressure at the inlet of burner 100 to account for line losses and variations in burner inlet pressure. This high potential pressure head provides the major driving force for the transport of the mixture of particulate source of heat and char to burner 100, and provides a pressure seal to prevent reverse or backflow from burner 100.

Angle bend 95 connects the bottom of standpipe 92 to the low end of angle riser 96. The bottom of vetical riser 98 is connected to the high end of angle riser 96, and the top of vertical riser 98 is connected to the inlet of burner 100. Angle riser 96 and vertical riser 98 serve as a particle transport conduit through which the particles at the bottom of standpipe 92 are transported by a transport gas. The transport gas is introduced in part by a plurality of nozzles 97 distributed along angle riser 96 and at angle bend 95. Nozzles 97 are fed by gas line 99. Nozzles 97 are oriented to project gas along the direction of flow in angle riser 96 to lift the transported particles to vertical riser 98. At this point, substantially more transport gas is introduced by nozzle 101, which provides a final suctiontransport force to lift the particles under high gas flow rates to burner 100. The transport gas introduced into angle riser 96 lifts the particles at the bottom of standpipe 92 up to the bottom of vertical riser 98 and reduces the density somewhat of the fluidized particles. The transport gas introduced by nozzle 101 lifts the particles up to burner 100 and substantially reduces the density of the fluidized particles. As a result, the potential pressure head at the bottom of vertical riser 98 is substantially less than that at the botton of standpipe 92. Additional transport gas is introduced at distributed points along the length of vertical riser 98. The described cross connection from stripper hopper 60 to burner 100 thus provides a pressure seal to prevent backflow of gaseous source of oxygen, typically air, to the pyrolysis side of the apparatus.

If zone 58 contains char and a different high density inorganic heat source or ash, and too many fines are present in zone 58, too much ash will be present at point of sampling 93 and the top of zone 58 will be rich in char. Thus, the described cross connection will not supply enough char to burner 100 to achieve the desired particle temperature therein. To provide for this contingency, a screened sampling point 85 located near the top of zone 58 is connected by a downwardly sloping conduit 89 and an upwardly sloping conduit 90 to vertical riser 98 at a point near the top end of angle riser 96. A normally closed valve 91 is disposed between conduit 89 and conduit 90. When too many fines are present in zone 58, valve 91 is opened and char-rich fluidized particles are supplied to burner 100 through conduits 89 and 90, to supplement the particles supplied through standpipe 92.

In burner 100, the particles used fpr pyrolysis are raised to the temperature requisite for introduction to the pyrolysis reactor by partial or total combustion. In the instance where char is the particulate source of heat, a portion of the char is combusted in the presence of the air introduced as the transport gas through nozzle 101 and along the length of vertical riser 98 and/or by combustion air introduced by line 102 to burner 100. The air is preheated in exchanger 104 by the flue gas from burner 100. Control may be exercised over the combustion conditions in char burner 100 by limiting the amount of air introduced. The source of oxygen is designated in FIG. 1 by the encircled letters "AIR".

Where ash is to be employed as the particulate source of heat, burner 100 must be maintained at a temperature below the fusion temperature of the ash formed as a consequence of oxidative decarbonization of char. To form ash, combustion in burner 100 is from about 80% to 100% complete, and sufficient air is introduced to achieve this end. To control combustion temperature, water is introduced along with air to convert the water into mist, which acts as a uniform quench to absorb the heat of combustion through vaporization. In the instance of the use of ash as the heat source, burner 100 is maintained at a temperature between 1350° F and 1400° F. Water requirements from the water source designated in FIG. 1 by the encircled letters "$H_2O$", are maintained and controlled by valve 103.

The products from burner 100 leave by line 106 and pass through burner cyclones 108 and 110. Both cyclones are low efficiency cyclones to control the size of the particles separated from the gas streams and eliminate from them, fines. Cyclone 108 serves primarily for the separation of coarse particles and cyclone 110 for particles of intermediate size. The collected particles are transferred by diplegs 112 and 114 to insulated surge hopper 116.

As illustrated in FIG. 1, the particles in surge hopper 116 and standpipe 40 are maintained in a dense fluidized state by the flow of aeration gas therethrough. In the event that ash is the source of heat and combustion in the burner is incomplete, air is introduced as part of the aeration gas to complete combustion with controlled introduction of a water mist as a quench.

The rate of solids withdrawal through standpipe 40 is controlled by setting slide valve 38, which is located at the bottom of standpipe 40. Hopper 116 and standpipe 40 serve as a collection vessel for the particulate source of heat. The bottom of standpipe 40 serves as the outlet of the collection vessel. The column of dense fluidized particles in standpipe 40 and hopper 116 lying above it produce a high potential pressure head that establishes a higher pressure at the bottom of standpipe 40 than the pressure at the inlet of pyrolysis reactor 20. The pressure at the inlet of valve 38 is preferably about 2 to 3 times the pressure at the inlet of pyrolysis reactor 20 to account for line losses and reactor inlet pressure variations. This high potential pressure head provides the major driving force for the transport of the particulate heat source to pyrolysis reactor 20 and provides a pressure seal to prevent reverse or backflow from pyrolysis burner 20.

Angle bend 36 connects the bottom of standpipe 40 to the low end of angle riser 42. The bottom of vertical riser 30 is connected to the high end of angle riser 42, and the top of vertical riser 30 is connected to the inlet of pyrolysis reactor 20. Angle riser 42 and vertical riser 30 serve as a particle transport conduit through which the particles at the bottom of standpipe 40 are transported by a transport gas. The transport gas is introduced in part by a plurality of nozzles 32 distributed along angle riser 42 and at angle bend 36. Nozzles 32 are fed by a gas line 34. Nozzles 32 are oriented to project gas along the direction of flow in angle riser 42 to lift the transported particles to vertical riser 30. At this point, substantially more transport gas is introduced by nozzle 35, which provides a final suction-transport force to lift the particles under high gas flow rates to pyrolysis reactor 20. The transport gas introduced into angle riser 42 lifts the particles at the bottom of standpipe 40 up to the bottom of vertical riser 30, and reduces the density somewhat of the fluidized particles. The transport gas introduced by nozzle 35 lifts the particles up to pyrolysis reactor 20 and substantially reduces the density of the fluidized particles. As a result, the potential pressure head at the bottom of vertical riser 30 is substantially less than at the bottom of standpipe 40. Additional transport gas is introduced at distributed points along the length of vertical riser 30. The described cross connection from surge hopper 116 to pyrolysis reactor 20 thus provides a pressure seal to prevent backflow of valuable product gas and oil to the oxidizing burner side of the apparatus.

Since pyrolysis occurs at some temperature intermediate of the temperature of the particulate heat source introduced into pyrolysis reactor 20 and the temperature of the feed, for minimum utilization of the particulate source of heat, the transport gas for the particulate heat source should approach its temperature. While air, if required, may be introduced to standpipe 40 as a fluidizing gas, the gas present beyond slide valve 38 is the non-deleterious carrier gas.

For good transport, the particles in surge hopper 116, are in a particle size range between about 10 to about 2000 microns, preferably between about 20 to about 1000 microns. To maintain the particles in surge hopper 116 within the desired particle size range, requires some periodic manipulation of the particles in surge hopper 116. In the instance where the particles become too fine, the level of particles in surge hopper 116 is raised by reducing the rate of withdrawal through line 118. This alone or in combination with the introduction of a small amount of transport gas into the hopper of cyclone 110 serves to disrupt the operation of cyclones 108 and 110 to reduce their efficiency still further. This separates fewer fines from the gas streams and increases the overall average particle size in surge hopper 116.

If, in contrast, the particles become too coarse, particles are withdrawn through line 118 at a rate greater than production for passage to elutriator quench drum 120. By the flow of an elutriating gas, the fines are returned by line 122 to hopper 116 to decrease the overall average particle size in hopper 116.

Surge hopper 116 is provided with bypass line 124 to remove fines entrained by its fluidizing gas.

The product not required for return to pyrolsyis reactor 20 is passed from elutriator quench drum 120 to product trim cooler 123 for withdrawal of char or ash.

The fines or fly ash from burner 100, along with any fines or fly ash removed with exhaust gas from hopper 116 by line 124, pass from cyclone 110 through velcoity reduction zone 128 to a cyclone 129, where some of the fines are removed. The remainder of the fines pass through line 126 to velocity reduction zone 130. After removal of settled fines in velocity reduction zone 130, the flue gas is used in heat exchanger 104 prior to passage to a suitable stack.

In the operation the solids in the hopper contain less than about 50% fly ash, the retained particles having a size greater than 10 microns with at least 50% of particles being greater than about 37 microns (400 mesh).

The vertical arrangement of standpipe 40, angle riser 42, vertical riser 30, pyrolysis reactor 20, cyclones 46 and 62, stripper hopper 60, standpipe 92, angle riser 96, vertical riser 98, burner 100, cyclones 108 and 110, and ash surge hopper 116 are important. A vertical scale, designated 133 in FIG. 1, illustrates the vertical arrangement of the components over a height of approximately 60 feet. Basically, cyclones 46, 62, 108 and 110, transport pyrolysis reactor 20, and burner 100 are all arranged at about the same elevation near the top of the facility; hoppers 60 and 116 are located at about the same elevation directly below cyclones 46 and 62 and cyclones 108 and 110, respectively, the bottoms of standpipes 40 and 92 are located at about the same elevation; the bottoms of vertical risers 30 and 98 are located at about the same elevation; the inlets of pyrolysis reactor 20 and burner 100 are substantially higher in elevation than the bottoms of standpipes 40 and 92, respectively.

For start up, there is employed reservoir 132 which is used to transport particulate materials to hopper 116 for initiation of the pyrolysis process. Any inert material such as sand or glass, may be heated and used for initial start up. It is, however, gradually supplanted by the char or ash formed in the pyrolysis process.

Figure 2:
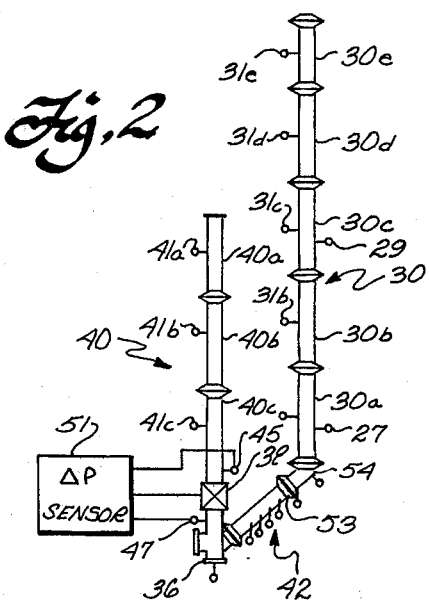
FIG. 2 is a side elevation view of the cross connection from the ash surge hopper to the pyrolysis reactor shown in FIG. 1.
Figure 4:
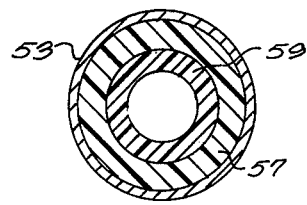
FIG. 4 is a sectional view of the angle riser shown in FIG. 3, which is typical of the entire cross connection.
Figure 3:
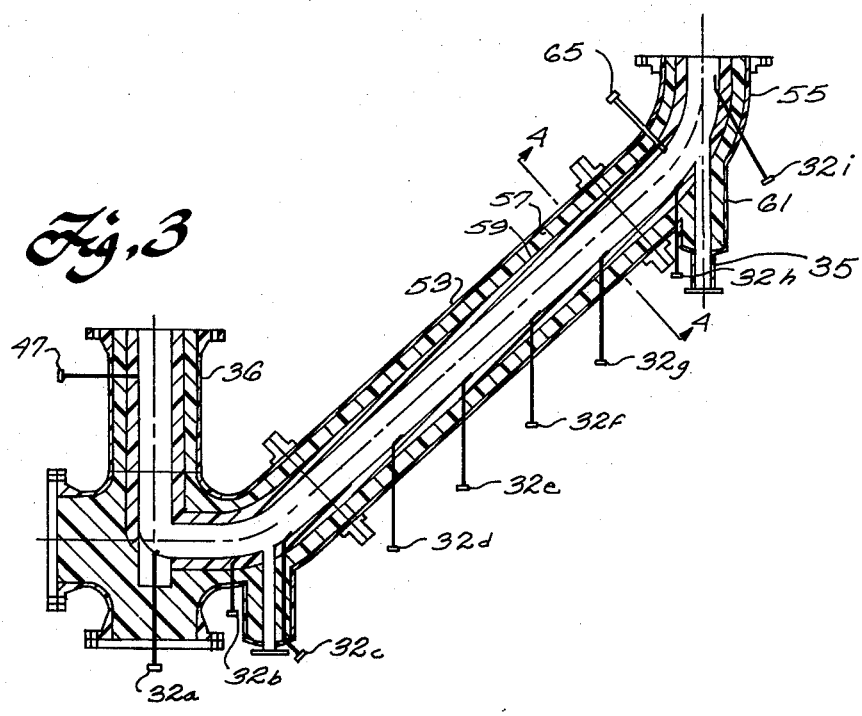
FIG. 3 is a side elevation view illustrating in more detail the angle bend and angle riser shown in FIG. 2.

Reference is made to FIGS. 2, 3, and 4 for a detailed description of the cross connection from surge hopper 116 to pyrolysis reactor 20. Standpipe 40 comprises pipe sections 40a, 40b, and 40c. Nozzles 41a, 41b, and 41c extend through the side wall of pipe sections 40a, 40b, and 40c, respectively, to provide aeration gas to standpipe 40. Slide valve 48 connects the bottom of standpipe 40 at pipe section 40c to angle bend 36. Pressure instrumentation taps 45 and 47 extend through the side wall of section 40c and angle bend 36, respectively, on opposite sides of slide valve 38. The inputs of a differential pressure sensor 51 are connected to taps 45 and 47, respectively. When the pressure difference across slide valve 38 drops below a predetermined minimum value, indicating that reverse flow is imminent, differential pressure sensor 51 produces a signal that shuts off slide valve 38.

Angle riser 42 comprises a pipe section 53 and a quarter elbow 55. As depicted by cross-sectional view of section 53 in FIG. 3, the entire cross connection including angle bend 36, section 53, and elbow 55, has an annular outer layer of heat insulation 57 and an annular inner layer of heat insulation 59, which is composed of an abrasion resistive material. In one embodiment, the inside diameter of the cross connection is 15 inches, the inside diameter of layer 57 is 10 inches, and the inside diameter of layer 59 is 6 inches. Nozzles 32a, 32b, and 32c extend through the wall of angle bend 36 to its interior. Nozzles 32d, 32e, 32f, and 32g extend through the wall of section 53 at uniformly distributed points along its length to its interior. Nozzles 32h and 32i extend through the side wall of elbow 55 to its interior. As illustrated in FIG. 3, all of these nozzles are oriented to inject gas into the interior of the cross connection in the desired direction of particle transportation and their outlets are located along the edge of the interior of the cross connection so as to be out of the gas stream. The gas ejected from nozzles 32a through 32i tends to draw the particles entering angle bend 36 into section 53 and to lift such particles through section 53 and elbow 55 to vertical riser 30. Nozzle 35 extends through elbow 55 toward the bottom of vertical riser 30; the gas ejected therefrom carries particles upwardly to pyrolysis reactor 20. A temperature tap 63 is employed to monitor the temperature in elbow 55.

Vertical riser 30 comprises pipe sections 30a, 30b, 30c, 30d, and 30e. Nozzles 31a, 31b, 31c, 31d, and 31e extend through the side wall of pipe sections 30a, 30b, 30c, 30d, and 30e, respectively, to provide transport gas to vertical riser 30. Pressure instrumentation taps 27 and 29 extend through the side wall of sections 30a and 30c, respectively.

The cross connection from stripper hopper 60 to char burner 100 is identical to the cross connection described above in connection with FIGS. 2, 3, and 4, except that the cross connection need not be insulated and that standpipe 92 and vertical riser 98 are slightly shorter than standpipe 40 and vertical riser 30, respectively.

The use of the double closed loop apparatus of this invention eliminates the need for the use of rotary lock valve and the like through the standpipes and transport conduits used to cross connect the two sides of the system. While rotary lock valves can be used for hopper 60, no practical valve exists to enable the feed of the high temperature particulate feed contained in surge hopper 116 on a continuous basis. Because the standpipe pressures are a function of particle density, the preferred particulate source of heat is the high density ash formed by decarbonization of char.

While nowise limiting, the following example is illustrative of the presently preferred practice of the invention.

EXAMPLE

Organic solid waste resulting from the treatment of municipal solid waste to remove the inorganic constituents, is dried and comminuted to a particle size less than 8 mesh. The organic solid waste having the composition shown in Table 2 is fed at a rate of 9491.4 pounds per hour to a pyrolysis reactor using as the carrier gas a product gas of the composition shown in Table 3.

TABLE 2

| Component | Weight % |
|---|---|
| Organics | 92.29 |
| Metals | 0.38 |
| Glass | 1.69 |
| Inorganics | 1.40 |
| Other Solids | 0.62 |
| Water | 3.62 |

TABLE 3

| Carrier Gas Composition | Volume % |
|---|---|
| $H_2S$ | 0.31 |
| $N_2$ | 0.86 |
| $CO_2$ | 32.42 |
| $CO$ | 31.13 |
| $H_2$ | 10.54 |
| $CH_4$ | 5.13 |
| $C_2H_4$ | 2.56 |
| $C_2H_6$ | 0.88 |
| $C_3$ | 0.88 |
| $H_2O$ | 15.28 |
| Total | 100.0 |
| Av. M.W. | 28.43 |

The carrier gas has a temperature of 500° F, and the organic solid waste to carrier gas weight ratio is 2.0. The nominal solids temperature is 100° F. Inlet pressure is 13 psig.

Simultaneously, 49,831 pounds per hour of an ash formed from decarbonization of char is transported along by about 480 pounds per hour of the carrier gas employed to the pyrolysis reactor. Ash temperature is about 1350° F. Approximate particle density is as follows: 60 lbs/cu.ft. in surge hopper 116; 65 lbs/cu.ft. in standpipe 40; 60 lbs/cu.ft. in angle riser 42; and 15 lbs/cu.ft. in vertical riser 30. Approximate static pressure is as follows: 23 psig at the inlet of slide valve 38; 21 psig at the bottom of standpipe 40; 17 psig at the bottom of vertical riser 30; and 14 psig at the inlet of pyrolysis reactor 20. Nominal operating pressure of pyrolysis reactor 20 is 10.5 psig. Approximate aeration gas flow rate is as follows: 2 scfm into standpipe 40; 46 scfm into angle riser 42 through nozzles 32; 51 scfm into the bottom of vertical riser 30 through nozzle 35; and 5 scfm along the length of vertical riser 30.

The average temperature in pyrolysis reactor 20 is 950° F. Average residence time of the organic solid waste and ash is 0.6 second.

After pyrolysis, the discharge composition from pyrolysis reactor 20 is 12,883.6 pounds per hour of gas, including 3,659 pounds per hour of water, 1,829.5 pounds of char, and the total ash fed to the pyrolysis reactor. The gas effluent is passed to a first product cyclone which separates 51,120 pounds per hour of solids from the gas stream and a second cyclone which separates 269 pounds per hour of solids from the gas stream. The balance of the gas stream advances to fine cyclone which separates 207 pounds per hour of essentially fine char, as product from the gas stream. After quench separation of pyrolytic oil, the residual gas stream at a rate of 13,419 pounds per hour, is made available as a heating gas and gas for the process. The excess is flared to the atmosphere. The composition of the pyrolytic oil and char is shown in Table 4.

TABLE 4

DRY CHAR AND DRY PYROLYTIC PRODUCT COMPOSITIONS (Wt. %)

|  | Char | Oil |
|---|---|---|
| Carbon | 48.8 | 57.0 |
| Hydrogen | 3.3 | 7.7 |
| Nitrogen | 1.1 | 1.1 |
| Sulfur | 0.2 | 0.2 |
| Chlorine | 0.3 | 0.2 |
| Ash | 33.0 | 0.2 |
| Oxygen | 13.3 | 33.6 |

The physical properties and particle size distribution of the ash and char fed to the product cyclones is shown in Table 5.

TABLE 5

|  | Ash | Virgin Char |
|---|---|---|
| Composition, wt. % | 96.5 | 3.5 |
| Particle density, lbs/ft$^3$ | 150.0 | 112.0 |
| Skeletal density, lbs/ft$^3$ | 150.0 | 150.0 |
| Settled bulk density, lbs/ft$^3$ | 58.0 | 12.5 |
| Size Distribution, Wt. % |  |  |
| 0 ~ 10 microns | 1.2 | 34.0 |
| 10 ~ 20 | 7.8 | 24.0 |
| 20 ~ 40 | 13.0 | 19.0 |
| 40 ~ 80 | 16.0 | 10.0 |
| 80 ~ 120 | 18.0 | 4.0 |
| 120 ~ 160 | 13.0 | 2.0 |
| 160 ~ 200 | 10.0 | 1.5 |
| 200 ~ 400 | 15.0 | 2.5 |
| 400 ~ 600 | 2.5 | 1.2 |
| 600 ~ 1000 | 2.0 | 1.1 |
| 1000 ~ 2000 | 1.5 | 0.7 |
| 2000 + |  |  |

Of the particles 99.96% are received as an ash char mixture, and the balance as fine char product.

Of the mixture of ash and char collected in the stripper hopper 60, solids are removed at a rate of 51,388 pounds per hour, and fed to burner 100. Approximate particle density is as follows: 50 lbs./cu. ft. in zone 58 of stripper hopper 60; 55 lbs./cu. ft. in standpipe 92; 50 lbs./cu. ft. in angle riser 96; and 16 lbs./cu. ft. in vertical riser 98. Nominal operating pressure of burner 100 is 9.3 psig. Approximate static pressure is as follows: 22 psig at the inlet of valve 94; 18 psig at the bottom of standpipe 92; 15 psig at the bottom of vertical riser 98; and 11 psig at the inlet of burner 100. Approximate aeration gas flow rate is as follows: 2 scfm into standpipe 92; 59 scfm into angle riser 96 through nozzles 97; 53 scfm into the bottom of vertical riser 98 through nozzle 101; and 4 scfm along the length of vertical riser 98.

Decarbonization of the char by oxidation in burner 100 is at an average burner temperature of 1350° F. Char is supplied in excess of that required to achieve total decarbonization in char burner 100. To maintain burner temperature, water is fed as a fog to burner 100 at a rate of 2904 lbs/hr. The resultant ash and gases are passed to a first burner cyclone which separate ash at the rate of 49,914 pounds per hour and then to a second burner cyclone which receives ash at the rate of 306 pounds per hour. The ash collects in hopper 116 and is maintained at the ash particle size shown in Table 5. Residual gas stream containing 120 pounds per hour of fines is passed to a fines accumulator. The ash collected in ash storage hopper is withdrawn as product net recovery rate of 84 pounds per hour. The flue gas from the char burner is employed to preheat the air required for combustion. In this instance, the air is heated to a temperature of 650° F by indirect heat exchange with flue gas following which the flue gas is flared to the atmosphere. In the operation, nominal residence time in the pyrolytic reactor is 0.3 second, and in burner 100 0.6 second. Average residence time of solids in ash stripper is 3 minutes, and the ash surge hopper 5.5 minutes.

What is claimed is:

1. Apparatus for pyrolyzing organic solid waste comprising:

(a) a transport pyrolysis reactor providing a first inlet for receiving particulate organic solid waste and a second inlet for receiving a particulate source of heat selected from the group consisting of a carbon containing solid residue of pyrolysis, an inorganic heat source formed by decarbonization of the carbon containing solid residue of pyrolysis, and mixtures thereof adjacent one end of the transport pyrolysis reactor and an outlet for the products of pyrolysis adjacent the opposed end of said transport pyrolysis reactor;

(b) means for passing particulate organic solid waste into the first inlet of said transport pyrolysis reactor and means for passing the particulate source of heat in a nondeleteriously reactive transport gas into the second inlet of said transport pyrolysis reactor for combination and passage with the particulate organic solid waste through the transport pyrolysis reactor under turbulent flow conditions for a time sufficient to pyrolyze the organic solid waste to yield the carbon containing solid residue of pyrolysis, pyrolytic oils, and gases at a given pressure at the second inlet of the transport pyrolysis reactor;

(c) means for separating the particulate source of heat and carbon containing solid residue of pyrolysis from the pyrolytic oils and gases exiting the outlet of the transport pyrolysis reactor;

(d) a first collection vessel providing an outlet at the base thereof for collection of the particulate source of heat and carbon containing solid residue of pyrolysis;

(e) means for depositing the separated particulate source of heat and carbon containing solid residue of pyrolysis in the first collection vessel;

(f) a burner having an inlet for receiving the carbon containing solid residue of pyrolysis and particulate source of heat from the first collection vessel;

(g) a first transport conduit connected from the outlet of the first collection vessel to the inlet of the burner;

(h) means for introducing a transport gas into the first transport conduit to transport the separated particulate source of heat and carbon containing solid residue of pyrolysis from the first collection vessel to the burner;

(i) means for passing the separated particulate source of heat and carbon containing solid residue of pyrolysis through the burner, at a given burner inlet pressure, in the presence of a gaseous source of oxygen for a time sufficient to form the particulate source of heat by at least partial decarbonization of the carbon containing solid residue of pyrolysis for passage to the pyrolysis reactor;

(j) a second collection vessel providing an outlet at the base thereof;

(k) means for depositing at least a portion of the formed particulate source of heat in the second collection vessel;

(l) a second transport conduit connected from the outlet of the second collection vessel to the second inlet of the pyrolysis reactor;

(m) means for introducing the nondeleteriously reactive transport gas into the second transport conduit to transport the particulate source of heat from the second collection vessel to the pyrolysis reactor;

(n) first means for establishing a higher pressure at the outlet of the first collection vessel than the given pressure at the inlet to the burner to prevent reverse flow through the connecting transport conduit; and (o) second means for establishing a higher pressure at the outlet of the second collection vessel than the given pressure at the second inlet of the pyrolysis reactor to prevent reverse flow through the connecting transport conduit.

2. The apparatus of claim 1 in which the inlets of the pyrolysis reactor and burner are substantially higher in elevation than the outlets of collection vessels to which they are respectively connected, the means for respectively establishing a higher pressure at the outlet of the first collection vessel than the given pressure of the burner and at the outlet of the second collection vessel than the given pressure of the transport pyrolysis reactor comprise in each instance a vertical standpipe extending downwardly from the collection vessel to the respective transport conduit and forming the outlet, and means for aerating the particles in each collection vessel to a dense fluidized state, and the means for introducing a transport gas into each transport conduit to further aerate the particles passing through such conduit into a substantially less dense fluidized state.

3. The apparatus of claim 2, in which the outlet of the first collection vessel is positioned to provide a pressure at the outlet of about 1.5 to 3 times the pressure at the inlet of the burner.

4. Apparatus of claim 2 in which the outlet of the second collection vessel is positioned to provide a pressure at the outlet of about 2 to 4 times the pressure at the second inlet of the transport pyrolysis reactor.

5. The apparatus of claim 2, in which each transport conduit comprises an angle riser having a low end forming part of an angle bend connected to the standpipe of a collection vessel, and a high end, a vertical riser having a bottom connected to the high end of the angle riser and a top connected to the corresponding inlet of said burner or pyrolysis reactor; the means for introducing a transport gas into each transport conduit comprises a plurality of first nozzles distributed along the corresponding angle riser and directed toward the high end thereof for introducing transport gas into the angle riser to lift the particles passing therethrough, and a second nozzle located at the bottom of the vertical riser for introducing transport gas to lift the particles through the vertical riser to the inlet to which the transport conduit is connected, and which additionally comprises an adjustable slide valve at the bottom of the standpipe to permit control of the particle flow from the outlet of the corresponding collection vessel to the angle riser.

6. The apparatus of claim 5, additionally comprising means for sensing the pressure difference across each adjustable slide valve and means for closing such valve when the pressure difference drops below a predetermined value.

7. The apparatus of claim 6, in which means are provided to introduce the transport gas into the angle riser through the first nozzles in a quantity sufficient to lower the bulk density of the particles about 10% and means are provided to introduce the transport gas into the vertical riser through the second nozzle in a quantity sufficient to lower the bulk density of the particles about 70%.

8. The apparatus of claim 7, in which the first nozzles of the transport conduit associated with the burner are connected to a source of a nondeleteriously reactive gas and second nozzle is connected to a gaseous source of oxygen.

9. The apparatus of claim 1, additionally comprising aerating means in the first collection vessel for stripping oil from the separated particulate source of heat and carbon containing solid residue of pyrolysis.

10. The apparatus of claim 1, in which the means for passing the separated particulate source of heat and carbon containing solid residue of pyrolysis through the burner includes means for introducing a gaseous source of oxygen and a water mist into the burner.

11. The apparatus of claim 10, additionally comprising means for continuously withdrawing a portion of the formed particulate source of heat from the second collection vessel.

12. The apparatus of claim 11, additionally comprising means for introducing a gaseous source of oxygen into the second collection vessel to further combust the formed particulate heat source.

13. The apparatus of claim 12, additionally comprising means for introducing a water mist into the second collection vessel to control the temperature therein.

14. Apparatus for pyrolyzing organic solid waste comprising:
   (a) a transport pyrolysis reactor providing a first inlet for receiving particulate solid waste and a second inlet for receiving a particulate source of heat at one end thereof and an outlet at the opposed end;
   (b) means for passing particulate organic solid waste into the first inlet;
   (c) a first vertical riser coupled to the second inlet for transporting a particulate source of heat selected from the group consisting of a carbon containing solid residue of pyrolysis, an inorganic heat source formed by decarbonization of the carbon containing solid source of pyrolysis and mixtures thereof in the nondeleteriously reactive transport gas into said second inlet for combination with introduced particulate organic solid waste under turbulent flow conditions in the transport pyrolysis reactor for a time sufficient to pyrolyze the particulate solid waste to yield the carbon containing solid residue of pyrolysis, pyrolytic oils and gases;
   (d) first cyclone separation means coupled in receiving relation to the outlet of the transport pyrolysis reactor for separating the particulate source of heat and carbon containing the solid residue of pyrolysis from the pyrolytic oils and gases, the cyclone separation means having a solids outlet and a gas outlet;
   (e) a first solids collection vessel coupled in closed solids receiving relation to the solids outlet of such cyclone separation means for collection of the particulate solid source of heat and carbon containing solid residue of pyrolysis, said first solids collection vessel having a solids outlet and including means to aerate collected particulate solid source of heat and carbon containing solid residue of pyrolysis;
   (f) a first vertical standpipe connected at one end to the solids outlet of the first collection vessel and having at the opposed end a slide valve to control the flow of particulate solids from the first collection vessel;
   (g) a first angle riser having a low end connected in particulate solid receiving relationship to the slide valve, an angle bend and a high end connected to a second vertical riser coupled in particulate transport relationship to a burner, the angle riser including nozzle means for introduction of a transport gas to the transport particles received from the first slide valve to the burner, said burner including means for receiving the particulate source of heat and carbon containing solid residue of pyrolysis from the second vertical riser and means to introduce a source of oxygen for combustion of carbon contained in the mixture of particulate solid source of heat and carbon containing solid residue to form the particulate source of heat and an outlet;
   (h) a second cyclone separation means connected to the outlet of the burner for separating the particulate source of heat from gaseous products of combustion;
   (i) a second solid collection vessel coupled in solid receiving relation to the second cyclone separation means receiving the particulate source of heat from the cyclone separation means and having a solids outlet at the base thereof;
   (j) a second standpipe coupled to the solids outlet of the second collection vessel and to a second slide valve;
   (k) a second angle riser having a low end coupled in particulate solids receiving relationship to the second slide valve, an upper end coupled to the first vertical riser, and nozzle means for injection of a transport gas into the angle riser for transport of the particulate source of heat to the second inlet of the transport pyrolysis reactor; wherein the first slide valve in combination with the first solids collection vessel cooperate to provide, when said solids collection vessel and standpipe contain particulate solids, a pressure at the end of the standpipe connected to the slide valve greater than the operating pressure of the burner to prevent backflow of solids and wherein the second slide valve in combination with the second particle collection vessel and second standpipe cooperate to provide, when containing particulate solids, a pressure at the end of the second standpipe connected to the slide valve greater than the operating pressure of the transport pyrolysis reactor to prevent backflow of solids therethrough.

* * * * *

UNITED STATES PATENT AND TRADEMARK OFFICE
CERTIFICATE OF CORRECTION

PATENT NO. : 4,088,541

DATED : May 9, 1978

INVENTOR(S) : Charles K. Choi et al

It is certified that error appears in the above-identified patent and that said Letters Patent are hereby corrected as shown below:

Column 2, line 22, for "vertica" read -- vertical --.
Column 7, line 24, for "fpr" read -- for --. Column 9, line 19, for "velcoity" read -- velocity --.

Signed and Sealed this

Tenth Day of October 1978

[SEAL]

Attest:

RUTH C. MASON
*Attesting Officer*

DONALD W. BANNER
*Commissioner of Patents and Trademarks*